10 microns 10 microns

INVENTORS
OSCAR R. ABOLAFIA
JOHN A. BUTORA
MICHAEL T. ORINIK

BY Sughrue, Rothwell, Mion, Zinn & Macpeak

ATTORNEYS

United States Patent Office 3,705,118
Patented Dec. 5, 1972

3,705,118
PROCESS FOR FORMING A MICROPOROUS
CELLULAR POLYIMIDE
Oscar R. Abolafia, Endicott, John A. Butora, Endwell, and Michael T. Orinik, Binghamton, N.Y., assignors to International Business Machines Corporation, Armonk, N.Y.
Filed Jan. 11, 1971, Ser. No. 105,466
Int. Cl. C08j 1/20
U.S. Cl. 260—2.5 N    7 Claims

ABSTRACT OF THE DISCLOSURE

A process for the preparation of a microporous cellular polyimide article comprising preparing a mixture in an inert solvent of polyamic acid and p,p'-oxybis(benzene sulfonyl hydrazide) as a blowing agent, forming the mixture into a shaped article, allowing the article to dry wherein the blowing agent simultaneously decomposes to form a foamed article and heating the foamed article to cyclize the polyamic acid is disclosed. The foamed article contains micropores of about 1 micron in diameter which improves adhesion at polymer-polymer and polymer-metal interfaces.

BACKGROUND OF THE INVENTION (1) Field of the invention

This invention relates to a process for preparing micropores in polymer matrices. More particularly, this invention relates to a process for the preparation of a microporous cellular polyimide article using polyamic acid to form the polymer matrix and p,p'-oxybis(benzene sulfonyl hydrazide) as the blowing agent, which decomposes catalytically at room temperature in the presence of the polyamic acid to form a microporous structure. The structure is subsequently heated to cyclize the polyamic acid into a polyimide resulting in the formation of a stable microporous cellular polyimide article.

(2) Description of the prior art

The preparation of cellular polymeric structures is well known and generally comprises the addition to a monomer mixture of a blowing agent, such as a material which on decomposition gives off nitrogen, oxygen, or carbon dioxide forming the pores in the resinous composition. The evolution of the gas with simultaneous or subsequent curing of the polymer forms the cellular material. The preparation of such cellular structures is well known, as for example, in the preparation of foamed polyurethanes and foamed polyethylenic products. Suitable blowing agents which have been used in the prior art and which are well known are materials such as azobisformamide, which on decomposition give rise to the generation of nitrogen, certain organic carboxylic acids and the salts thereof, such as formic acid and oxalic acid, which on decomposition generate carbon dioxide, and other materials such as sodium borohydride, which on decomposition give rise to the generation of hydrogen forming the cells in polymeric materials. In addition the vaporization of volatile solvents has also been used to create porous cellular structures in polymeric materials.

In particular, as disclosed in U.S. Pat. 3,249,561, it is known that cellular structures of polyimides can be prepared. The process described therein involves the preparation of a polyamide-acid solution in which a gas producing acid, such as formic acid or oxalic acid, trichloroacetic acid, and malonic acid, for example, causes foaming in the polyamide-acid to prepare a foamed polyimide article. However, by using this method, the preparation of macroporous cells results. In addition, in this method the decomposition of the blowing agent and the polymerization of the polyamide-acid to the polyimide occurs simultaneously due to the necessity for heating the blowing agent to temperatures, as for example, in the range of about 300° C. to accomplish the preparation of the cellular material. Thus, this method possesses the disadvantages attendant to prior art methods whereby polymerization and blowing occur simultaneously and whereby the decomposition of the blowing agent is accomplished at high temperatures. Not only does this introduce process variables which are difficult to control, such as temperature uniformity throughout the mix, but also results in the preparation of larger pores than that desired for certain applications, as for example, in microcircuitry or in ultramicrocircuitry where it is desired that the pore size be in the micron range. For example, electroplating interconnectors into the "holes" between the metallic conducting layers and through the dielectric causes shorts into the adjoining connectors if the pore size is in macromolecular range. With prior art techniques, the blowing agent on decomposition at a temperature of about 300° C. necessarily results in an undue expansion of the gas formed thus creating a large pore size, which is unsuitable for the above-described uses. The prior art processes are deficient in many applications in that pore sizes of upwards of 10 microns are formed and such is the case in which even only elevated temperatures of about 150° C. were used.

Accordingly, an object of this invention is to provide a process for the preparation of cellular polyimide articles having a microporous cellular structure.

In addition, another object of this invention is to provide a process wherein the advantageous unique high temperature resistance, solvent resistance and low dielectric properties of polyimide articles can be used as dielectrics in multi-layered electronic circuitry.

Another object of this invention is to provide a process whereby a cellular structure having pore size in the range of from about 0.5 to about 1.5 microns can be prepared.

SUMMARY OF THE INVENTION

The objects of this invention are achieved according to the process for preparing a microporous cellular polyimide article. The process for preparing the microporous polyimide article comprises the steps of (1) preparing a mixture in an inert solvent of a polyamic acid and from 0.5 to 10.0% by weight based on the polyamic acid of p,p'-oxybis(benzene sulfonyl hydrazide);
(2) forming the mixture into a shaped article;
(3) allowing the article to dry wherein the p,p'-oxybis-(benzene sulfonyl hydrazide) simultaneously decomposes to form a foamed article; and
(4) heating the foamed article to cyclize the polyamic acid forming the microporous cellular polyimide article.

DESCRIPTION OF THE ACCOMPANYING DRAWINGS

FIG. 1 shows the microporous structure obtained according to the process of this invention.

FIG. 2 shows the macroporous structure obtained.

Figure 1:
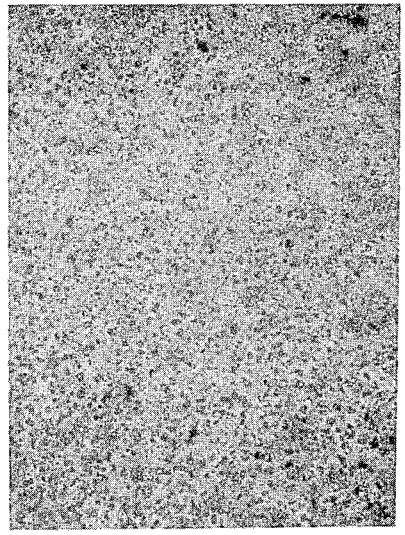
FIG. 1 is a photomicrograph of one embodiment of the process of this invention.
Figure 2:
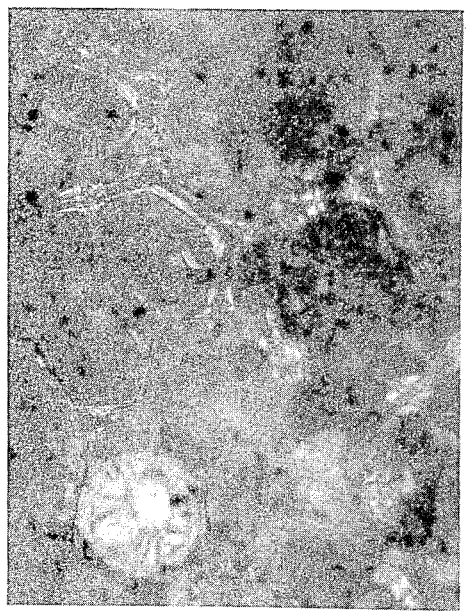
FIG. 2 is a photomicrograph of a conventional foamed polymeric article prepared by conventional process.

As can be seen from examining the structure obtained using a conventional process, as shown in FIG. 2, in comparison with the structure obtained according to one embodiment of the process of this invention, as shown by FIG. 1, the pores obtained with the process of this invention are uniformly distributed and are of the micro size.

DETAILED DESCRIPTION OF THE INVENTION

The process of this invention involves the preparation of a mixture of polyamic acid and the p,p'oxybis(benzene sulfonyl hydrazide) in an inert solvent. In this step of the process of this invention the materials are mixed to form a uniform mixture of the starting materials contained in an inert solvent.

The polyamic acid also designated in the art as polyamide acid, which is used in the inert organic solvent has the general formula comprising recurring units as shown below:

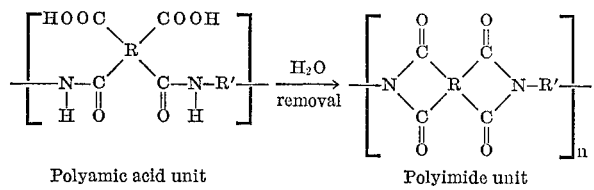

Polyamic acid unit      Polyimide unit wherein R is a tetravalent radical containing at least two carbon atoms with no more than two of the carbonyl groups being attached to the same carbon atom of R and wherein R' is a divalent radical containing at least 2 carbon atoms. The polyamic acid is used to form the polymeric matrix comprising the microporus cellular polyimide structure as a result of the process of this invention. The polyamic acid, used in the process of this invention to form the polymer, is well known and is commercially available, as for example, as RC5077 (a product of the E. I. du Pont de Nemours and Co.) in which the polyamic acid is a solution of 18.5% by weight of the acid in N-methyl-2-pyrrolidone or in dimethylformamide. Suitable polyamic acids and processes for their preparation which can be used are disclosed in U.S. Pats. 3,179,634, 3,179,631, 3,179,630, 3,179,614, and 3,179,633. A suitable method for preparing the polyamic acid is disclosed in U.S. Pat 3,179,630 and comprises reacting an organic diamine having the structure

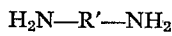

with at least one tetracarboxylic acid dianhydride having the formula

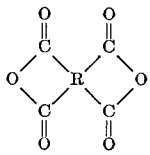

wherein R and R' are as above described in an inert organic solvent at a temperature below 175° C.

The blowing agent p,p'-oxybis(benzene sulfonyl hydrazide) used in the process of this invention to provide the microporous cellular polyimide article has the following general formula

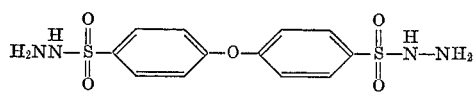

This material is also well known and commercially available as a powdered material as Celogen OT (U.S. Rubber-Uniroyal trademark) and is generally available as a solid powdered material.

In preparing the mixture of the blowing agent, the polyamic acid, and the inert solvent, the blowing agent is generally used in an amount ranging from 0.5 to 10% by weight based on the amount of the polyamic acid. A preferred range of from 0.5 to 5% by weight is generally used. Where an amount larger than 10% by weight is used, the advantageous microporous cellular structure is not obtained and the possibility that all of the blowing agent is not decomposed catalytically by the polyamic acid giving rise to undecomposed blowing agent remaining in the polyimide article can occur. In addition, if a level higher than 10% by weight is used, undesirable decomposition by-products remain in the foamed matrix which can have an effect on its properties such as the glass transition temperature, the adhesion to a substrate and the dielectric constant of the article prepared. Where lower than 0.5% is used, generally the amount of microporous cells formed is not sufficient to obtain the advantageous results of the microporous cellular structure obtainable with the process of this invention. Since the decomposition is at room temperature, less than 0.5% of blowing agent is inadequate to produce a continuous uniform microporous layer from 0.5 to 3 mils in thickness where coating applications are desired.

The preparation of the mixture of the polyamic acid and the blowing agent, the p,p'-oxybis(benzene sulfonyl hydrazide) is in an inert solvent. Generally, the polyamic acid is used at a level of from 3 to 25%, preferably from 5 to 18.5%, by weight to the amount of inert solvent present. The use of the inert solvent allows the preparation of a homogeneous and uniform mixture of the starting materials resulting in a uniform distribution of cells throughout the foamed polymeric article. The use of an inert solvent also results in handling advantages in that the material so prepared can be molded in a mold cavity, sprayed on a surface, coated on a support and the like.

Suitable inert solvents for use in preparing the mixture of the polyamic acid and the blowing agent are solvents such as N,N-dimethylformamide, N,N'-dimethylacetamide, N,N-diethylformamide, N,N-diethylacetamide, N,N-dimethylmethoxy acetamide, N-methylcaprolactam, dimethylsulfoxide, N-methyl-2-pyrrolidone, tetramethylene urea, pyridine, dimethylsulfone, hexamethylphosphoramide, tetramethylenesulfone, formamide, N-methylformamide, butyrolactone, N-acetyl-2-pyrrolidone and the like. These solvents can be used alone or in combination. They can also be used in combination with other solvents such as benzene, toluene, xylene, benzonitrile, dioxane, cyclohexane, cyclopentane and the like. Generally, any inert solvent in which the polyamic acid is soluble can be used. Generally, those solvents are suitable which have a boiling point in the range of from 33° C. to 250° C.

Suitable adjuvants can also be added to the mixture of the inert solvent, the polyamic acid, and the blowing agent where desired. Suitable adjuvants can be materials such as colorants, pigments, dyes, plasticizers, antistatic agents, and surfactants. In general, any adjuvant which does not react with the polyamic acid or which does not cause the premature decomposition of the blowing agent can be used.

The second step in the preparation of the microporous cellular polyimide article in accordance with the process of this invention involves forming the mixture into the shaped article. Any article shape can be used if desired. Accordingly, the liquid mixture of the polyamic acid and the blowing agent in the inert solvent can be extruded, molded, coated as a layer, or sprayed or laminated. An especially preferred embodiment is to form a thin layer of the mixture on a substrate by coating or spraying to form a microporous polyimide layer. Any of the conventional techniques for the formation of shaped polymeric articles can be used and any of the conventional techniques relating to the preparation of formed cellular articles can be employed. The formation of the mixture into a shaped article will, to a certain extent, be dependent upon the solvent used but generally can be at any temperature in the range of from 10° C. to 40° C., for example, with N-methyl-2-pyrrolidone. Temperatures approximately in the range of room temperature, i.e., from 18° C. to about 25° C., can be advantageously used in the preparation of the shaped article desired and are preferred. For example, where coating methods are used, the layer of the mixture of the inert solvent, the polyamic acid and the blowing agent can be coated onto any number of substrates as for example glass, polymers, metals, films and the like and the process thereby continued to obtain a substrate containing a layer of the microporous cellular polyimide article. For example, coating methods such as dip, spray and applicator roller coating can be used.

The third step in the process of this invention involves allowing the articles to dry wherein the blowing agent, the p,p'-oxybis(benzene sulfonyl hydrazide) is simultaneously decomposed to form the foamed article. The drying step allows the blowing agent, the p,p-oxybis(benzene sulfonyl hydrazide) to simultaneously decompose catalytically to form the foamed article. The drying step can be accomplished at any range of temperatures, e.g., from 10° C. to 40° C., preferably from 18° C. to 25° C. However, it is desirable that a temperature range approximating that of room temperature, e.g., from 18° C. to 25° C., be used in order to allow the solvent contained in the mixture of the inert solvent, the polyamic acid, and the blowing agent to be dispelled simultaneously with the catalytic decomposition of the blowing agent. Thus, it is desirable, from the standpoint of preventing solvent bubbles from forming due to excessively fast evaporation of the inert solvent contained in the mixture to allow the drying to occur over a period of time. For example, where coating techniques are used, the drying time can range from 1 hour to 4 hours, preferably from 1 to 2 hours at a temperature range of from 18° C. to about 30° C. for a coating of about 1 mil in thickness. Drying conditions will depend upon coating thickness with thicker coatings requiring more time.

The advantageous results obtained in forming the microporous cellular structure of the process of this invention is accomplished by the catalytic decomposition of the blowing agent, the p,p'-oxybis(benzene sulfonyl hydrazide), by simultaneous decomposition due to the action of the polyamic acid on solvent removal. This is in contrast to prior art procedures whereby elevated temperatures were necessary in order to cause the decomposition of the blowing agent. It is known that p,p'-oxybis (benzene sulfonyl hydrazide) decomposes at a temperature of 158–160° C. However, by the process of this invention, the unique combination of the polyamic acid and the p,p'-oxybis(benzene sulfonyl hydrazide) in an inert solvent such as N-methyl-2-pyrrolidone, results in the decomposition of the blowing agent on drying at room temperature. Thus, the advantageous results of the process of this invention can be obtained at room temperature in contrast to the situation in prior art processes in which, even when the p,p'-oxybis(benzene sulfonyl hydrazide) was used, a temperature range of about 158–165° C. was required for decomposition. Accordingly, the advantageous and unexpected results obtained with the process of this invention are due to the combination of the polyamic acid used and the blowing agent used to obtain the microporous cellular structure obtainable due to this unique combination. With the unique combination of the polyamic acid and the p,p'-oxybis(benzene sulfonyl hydrazide) resulting in the decomposition of the blowing agent in the temperature range approximating that of room temperature, the pore sizes obtained with the microporous cellular structure of this invention are in the range of from about 0.5 to about 1.5 microns and on the average are approximately 1.0 microns. The micropore size obtainable is due to the decomposition of the blowing agent at this low temperature and results in the ability to prepare a microporous cellular polyimide article unobtainable using processes described in the prior art. Using the process described in this invention, it is not necessary to heat-treat the mixture of the blowing agent and the polymer as was necessary with prior art processes. Accordingly, the necessity for blowing and polymerizing simultaneously is eliminated with the process according to the present invention. In addition, since the blowing agent decomposes giving off nitrogen, the amount of the expansion of the nitrogen gas formed in the decomposition of the blowing agent at the high temperatures required with prior art processes is not observed due to the decomposition at temperatures approximating room temperature.

The last step in the process in this invention involves the heating of the foamed article to cyclize the polyamic acid into the polyimide article. In general, the foamed article is simply heated, as a layer, as extruded, as a formed article and the like for from about 15 minutes to about 2 hours at temperatures ranging from 70° C. to 175° C., preferably from 100° C. to 160° C. in order to cyclize the polyamic acid into the polyimide structure giving rise to the polymeric microporous cellular article obtained by the process of this invention. Thus, the advantageous properties of the polyimide articles described above are obtained by the conversion, on heating, of the polyamic acid in the foamed structure to the polyimide structure giving rise to the utility of the microporous foamed article obtained by the process of this invention. Where desired, the heating step can be accomplished under pressure by the application of pressure to the layer or the foamed article and any conventional and known technique can be used. All that is necessary in the preparation of the ultimate foamed article, i.e., the conversion of the polyamic acid into the polyimide polymer, is to heat the article to the above-described temperature range. Thus, the use of pressure, to accomplish the formation of the foamed polyimide article, is an optional embodiment of the process of this invention.

The microporous cellular polyimide articles prepared by the process of this invention are useful in any application where a microporous cellular structure would be desirable. For example, layers of these materials can be coated on a metal or polymer substrate and provide markedly improved adherence at the polymer-metal or polymer-polymer interface due to the wetting characteristics of the polymer so formed. The improved adhesion is believed to be the result of increased surface area and the nature of the foam provides many anchoring points between the substrate and the adhesive.

The process of this invention, according to one embodiment, provides a technique whereby structurally sound, low dielectric layers for application in electronic circuitry can be prepared. More particularly, the polymer prepared according to the process of this invention, as for example, where used as a layer on a substrate, provides greater adhesivity to, for example, metal deposition and polymeric surfaces. For example, electroless copper shows very limited adhesion to polymeric surfaces. The method of this invention provides a micropore surface obtained by forming a layer as disclosed above and subsequently microtoming or abrasive blasting the surface to be used to expose a larger number of micropores for subsequent anchoring of, for example, a metal to the polymer substrate. These exposed pores can be used to anchor the metal to the polymer and also limit the "flow" of metal horizontally within the micropores to a limit of the micropore diameter. With prior art techniques macropores caused electrical shorting because deposited metal would fill the pore for a width of 10 or more microns, thus limiting the circuitry to that of a macro size. Improved dielectric properties also result with the microporous structure obtained with the process of this invention.

The following examples are given in order to illustrate the process of this invention without intending to limit the scope of the invention thereby.

EXAMPLE I

A uniform mixture was prepared by mixing 99.0 parts by weight of a commercially available polyamic acid, Du Pont RC 5077, 18% solution in N-methyl-2-pyrrolidone, and 1.0 part by weight of p,p'-oxybis(benzene sulfonyl hydrazide), Cellogen OT, U.S. Royal. The mixture was coated on a glass substrate at a thickness of about 1 mil for about 1 hour and allowed to dry at room temperature (about 18° C.). After the coated substrate was allowed to dry, the coated substrate was heated to a temperature of about 160° C. for about one hour and a coated polyimide layer having microporous cells of an average size of about 1 micron was obtained with the cells being uniformly distributed throughout the coating.

EXAMPLE II

The procedure of Example I is repeated except that 0.5 part by weight of sodium lauryl sulfate is added additionally to the mixture prepared in Example I prior to the coating of the mixture on the glass substrate. The procedure of Example I was continued except that the drying was at a temperature of about 25° C. Similar results to those in Example I were obtained.

EXAMPLE III

A uniform mixture was prepared by mixing 10 parts by weight of polyamic acid (using the Du Pont RC 5077 of Example I), 70 parts by weight of dimethylformamide and 20 parts by weight of toluene To this mixture was added 1 part by weight of p,p'-oxybis(benzene sulfonyl hydrazide). The mixture was blended to uniformity and coated on a polyethylene terephthalate substrate at a level of 0.5 mil in thickness. The coated substrate was dried at about 25° C. for 30 minutes to obtain a coated substrate having microcells of an average diameter of about 0.5 micron. The coated substrate was then heated to a temperature of about 100° C. for about two hours in order to form the polyimide.

What is claimed is:
1. A process for the preparation of a microporous cellular polyimide article comprising the steps of:
   (1) preparing a mixture in an inert solvent of a polyamic acid and from 0.5 to 10.0% by weight based on the polyamic acid of p,p'-oxybis(benzene sulfonyl hydrazide);
   (2) forming said mixture into a shaped article;
   (3) allowing said article to dry at a temperature of from 10° C. to 40° C. wherein said p,p'-oxybis(benzene sulfonyl hydrazide) simultaneously decomposes to form a foamed article; and
   (4) heating said foamed article at a temperature at from 70° C. to 175° C. to cyclize said polyamic acid, wherein said polyamic acid has recurring units of the general formula

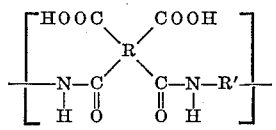

wherein R is a tetravalent organic radical containing at least two carbon atoms with no more than two of the carbonyl groups being attached to the same carbon atom of R and wherein R' is a divalent organic radical containing at least 2 carbon atoms.

2. The process of claim 1, wherein said p,p'-oxybis (benzene sulfonyl hydrazide) is present at a level of from 0.5 to 5% by weight.

3. The process of claim 1, wherein said inert solvent is selected from the group consisting of N-methyl-2-pyrrolidone, N,N-dimethylformamide, N,N-dimethylacetamide pyridine, and dimethyl sulfoxide.

4. The process of claim 1, wherein said heating is at a temperature of from 100° C. to 160° C.

5. The process of claim 1, wherein said shaped article is a coated layer on a substrate.

6. The process of claim 5, wherein said substrate is metal.

7. The process of claim 5, wherein said substrate is a polymer.

References Cited

UNITED STATES PATENTS

| 3,310,506 | 3/1967 | Amborski et al. | 260—2.5 N |
| 3,326,851 | 6/1967 | Tocker | 260—2.5 N |
| 3,312,663 | 4/1967 | Sorenson | 260—2.5 N |
| 3,349,061 | 10/1967 | Pruckmayr | 260—2.5 N |

MURRAY TILLMAN, Primary Examiner

M. FOELAK, Assistant Examiner

U.S. Cl. X.R.

117—161 P; 260—47 CP, 65, 78 TF